Figure 1:
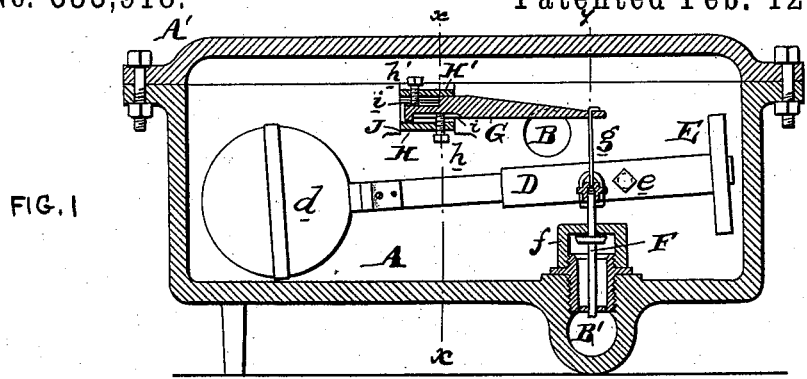

(No Model.)

J. POULSON.
STEAM TRAP.

No. 533,918. Patented Feb. 12, 1895.

Witnesses:
Hm. L. Evans.
H. L. Motherwell

Inventor.
Joseph Poulson
By
Attorney.

THE NORRIS PETERS CO., PHOTO-LITHO., WASHINGTON, D. C.

UNITED STATES PATENT OFFICE.

JOSEPH POULSON, OF PHILADELPHIA, PENNSYLVANIA.

STEAM-TRAP.

SPECIFICATION forming part of Letters Patent No. 533,918, dated February 12, 1895.

Application filed August 4, 1894. Serial No. 519,450. (No model.)

*To all whom it may concern:*

Be it known that I, JOSEPH POULSON, of the city and county of Philadelphia and State of Pennsylvania, have invented an Improvement in Steam-Traps, of which the following is a specification.

My invention has reference to steam traps, and consists of certain improvements which are fully set forth in the following specification and shown in the accompanying drawings which form a part thereof.

The object of my invention is to provide a suitable construction of steam trap which may have the usual float valve operating device for allowing the normal water of condensation to run from the trap when a sufficient quanity is accumulated, and also a second valve, preferably of larger area, which shall operate to permit the immediate discharge of excessive quantities of water of condensation such as is produced in starting up a large heating plant, or in a steam main of great length.

Heretofore difficulty has occurred in the use of steam traps having but a single valve operated by the float lever because in cases where there is a large volume of water due to the sudden condensation of the steam in passing through cold pipes, the water cannot escape from the trap sufficiently fast to prevent clogging up of the heating or steam pipes.

By my improvements I provide a second or auxiliary passage normally open for excessive quantities of water of condensation, and so operate the valve of this passage that the presence of steam within the trap will cause the valve to close and thereby prevent the escape of steam from the discharge port of the trap. Under ordinary operations after the pipes are heated the float valve causes the discharge of the water of condensation, but should the water rush into the trap so as to exclude the steam therefrom or in such quantities as to exclude the passage of steam into the trap, then the auxiliary valve automatically opens to permit the ready and immediate escape of such excessive quantities of water.

The device which I employ for operating the auxiliary valve is a lever adapted to be operated by the expansion or contraction of one or more plates or bars arranged within the trap and subjected to the action of the steam which may be applied thereto. When the steam heats the plates or bars the valve closes, and when the said plates or bars are cooled by the water or cool air they contract, and the valve again opens. Before turning the steam into the heating pipes the auxiliary valve will be normally open and the float valve closed. The trap is then in perfect condition to permit the ready escape of large quantities of water which may rush into it, for the said water finds an immediate escape by the large opening exposed by the raised auxiliary valve, and in addition thereto the water in the trap raises the float valve and provides a second passage for its escape. These traps would be arranged at any suitable place or places along the piping used in the connection with the circulation of steam, whether the steam be for heating purposes or power purposes, as the principle and operation of the apparatus will be precisely the same.

My invention will be better understood by reference to the accompanying drawings, in which—

Figure 2:
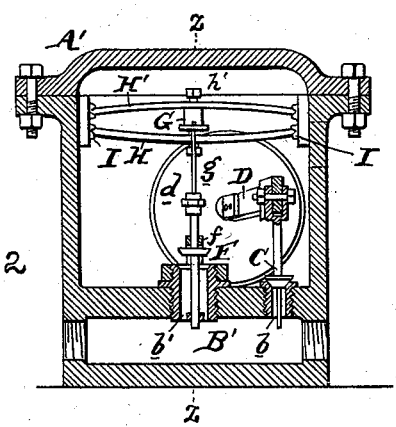
Figure 3:
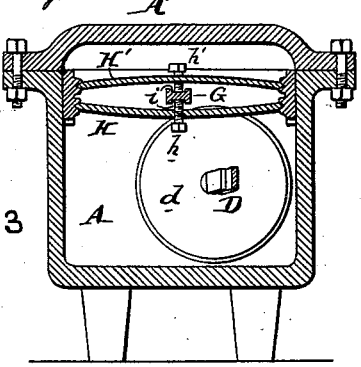
Figure 4:
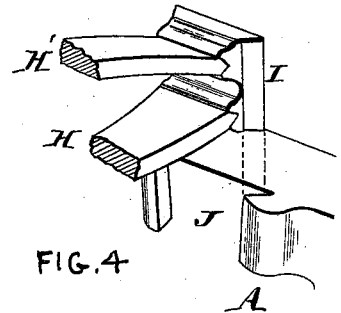
Figure 5:
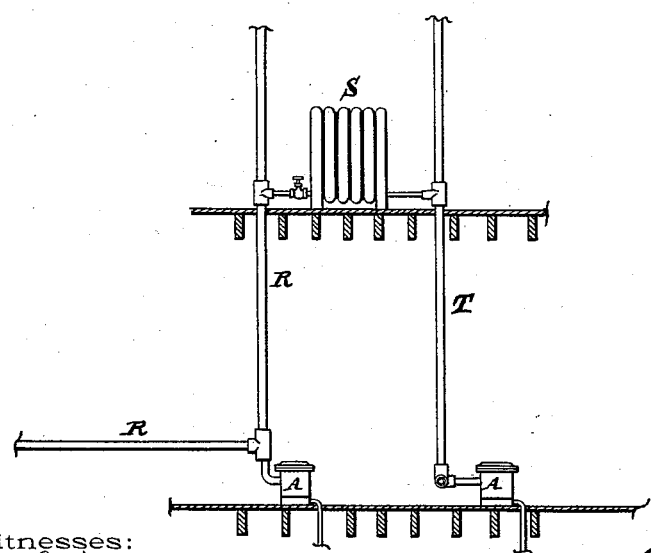

Figure 1 is a sectional elevation on line $z$—$z$ of Fig. 2 showing my improved steam trap. Fig. 2 is a cross section of same on line $y$—$y$ of Fig. 1. Fig. 3 is a cross section of same on line $x$—$x$ of Fig. 1. Fig. 4 is a perspective view showing the means of attaching the expansion plate or plates in the casing of the trap; and Fig. 5 is an elevation showing the adaptation of this trap to a steam heating plant.

A is the main casing of the trap, and is preferably formed box-shaped.

A' is a cap or cover adapted to be bolted to the casing.

B is the inlet port which is connected with the steam main of whatever character it may be.

B' is a transverse passageway or eduction port at the bottom of the trap with provision for connecting with the discharge pipes at the ends thereof.

Opening from the interior of the trap into the passageway B' through the floor of the casing are two valve ports $b$, $b'$, the former being preferably smaller than the latter. A valve C is adapted to the valve seat of the port $b$ and is operated by a lever D pivoted to the side of the case A at e and having a ball float d at one end and a counter weight E at the other end. The use of the counterweight is to enable the structure to be made heavy and yet be easily moved by the water which may enter the trap. When no water is in the trap the weight of the float d and lever D keeps the valve C down tightly upon the seat and closes the port b, but the instant the water enters the trap D the float d is raised, lifting the valve C, and permitting the escape of the water. This method of operating the valve is well known.

F is the auxiliary valve and is adapted to a seat formed in the port b' and is suitably guided by a bridge casting f formed above said seat.

The particular construction of the valve and valve seat is immaterial as it may be formed of any suitable construction desired.

The valve F is connected with a light rod g with the end of the arm G supported between the two screws h, h'. The ends of said screws are received in grooves i on the top and bottom sides of said arm G, and are respectively secured to transverse expansion bars or plates H, H' which are made of brass, bronze or other suitable and readily expansible metal. The ends of these plates H, H' are secured to the trap in any suitable manner. For purpose of illustration I have shown them received in recesses in blocks I clearly shown in Figs. 2, 3 and 4, the said blocks being forced down into recesses J in the casing A. One of these blocks I before being forced down in position is clearly shown in Fig. 4. A curvature is preferably given to the plates H, H' so that in expanding the central portions with their screws move away from each other.

It will now be seen that if the normal position of the valve F is that as shown in Figs. 1 and 2 when the trap is cold, this valve will remain open until the plates H, H' are sufficiently heated to cause them to expand. If the trap should contain steam, the said steam will sufficiently heat the said plates H, H' and will cause the lower screw to be moved down, and the upper screw to be moved up, permitting the free end of the arm G to drop and allow the valve F to reach its seat and thereby shut off any escape of the steam that may be passing into the traps through the induction port B. It is quite evident, if desired, that only one of the plates H, H' may be moved, but the movement of the arm G in this case would not be so great and either the arm should be increased in length or the expansion plate required to expand or contract to a greater extent to insure the same opening of the valve F. For this reason I prefer to make both of the supports or plates H, H' for the screws h, h' adjustable under expansion and contraction.

Referring now to Fig. 5, R represents the steam supply main; S, a heating coil or regulator; T, the bleeder pipe or return main.

The traps are shown at A, A in connection with supply main R and bleeder or return main T. It will be seen from this figure that any water of condensation that may find its way into the pipes R and T passes into the traps, and if the water is not excessive, steam will also exist in said pipes and traps and maintain the valve F closed. As the water of condensation increases the float actuated valve C is raised allowing the automatic escape of the water from the trap. If however in turning steam into the cold pipes there was an excessive rush of water into the traps, it will find the trap in the condition indicated in Figs. 1 and 2 in which case the water will find ready escape through the port of the larger valve F, and will also raise the smaller valve C and thereby be permitted to escape through the ports of both valves, and this will be maintained until steam commences to find its way into the trap, in which case the valve F is instantly closed, and the valve C closes automatically owing to the fact that the water in the trap has become discharged.

It is quite evident that the valve C and its float actuated devices might be omitted in some uses of my improved trap, as the expansion device controlling the valve F would operate automatically to discharge the water of condensation whenever the trap becomes filled to such an extent as to shut off the steam and permit the expansion plates H, H' to contract. I therefore do not confine myself to the use of the two valves, though that construction is preferable in most uses of the trap.

These traps may be arranged upon steam pipes of any kind and at any location thereof, the example given in Fig. 5 being merely illustrative of the possible use of the invention.

I do not confine myself to the mere details of construction shown as they may be modified in various ways without departing from my invention.

Having now described my invention, what I claim as new, and desire to secure by Letters Patent, is—

1. In a steam trap, the combination of the inclosing case having induction and eduction ports, a float actuated valve to control the escape of water from the trap, an auxiliary valve also controlling the discharge of the water from the trap, and actuating devices for said auxiliary valve controlled by the varying temperature within the trap.

2. In a steam trap, the combination of the inclosing case having induction and eduction ports, a float actuated valve to control the escape of water from the trap, an auxiliary valve also controlling the discharge of the water from the trap and opening against the pressure of steam and water on the induction side, and actuating devices for said auxiliary valve controlled by the varying temperature within the trap consisting of a movable arm connected with the valve and supported at one end, and one or more expansion plates or bars arranged within the trap and acting upon the arm to cause a portion of said arm to be raised or lowered for the purpose of imparting a movement to the valve.

3. In a steam trap, the combination of the inclosing case having induction and eduction ports, a float actuated valve to control the escape of water from the trap, an auxiliary valve also controlling the discharge of the water from the trap, and actuating devices for said auxiliary valve controlled by the varying temperature within the trap consisting of an arm adapted to fall by gravity for the purpose of closing the valve, and an expansion device arranged within the trap and adapted to act upon the arm to cause it to be raised when cold and lowered when heated or expanded.

4. In a steam trap, the combination of the inclosing case having induction and eduction ports, a float actuated valve to control the escape of water from the trap, an auxiliary valve also controlling the discharge of the water from the trap, opening upward in the chamber communicating with the induction port and actuating devices for said auxiliary valve controlled by the varying temperature within the trap, consisting of an arm connected with the auxiliary valve, two plates or bars supported by the casing of the trap and adapted under the application of a variable heat to move to or from each other, and projections carried by said plates operating upon the arm at different distances from the valve.

5. In a steam trap the combination of the inclosing case having induction and eduction ports, a valve controlling the discharge of the water from the trap adapted to close by the action of the discharge of water and steam through the trap, and actuating devices to govern the movement of said valve controlled by the varying temperature within the trap consisting of an arm connected with the valve, two plates or bars supported by the casing of the trap and adapted under the application of a variable heat to move to or from each other, and projections carried by said plates operating directly upon the arm at different distances from the valve.

6. The combination in a steam trap of a casing having induction and eduction ports, a float actuated valve of small size to control the escape of water of condensation when not excessive, an auxiliary valve of large size to control the water of condensation when excessive, and devices to open or close the large auxiliary valve controlled by the heat within the trap, whereby when steam is contained within the trap the valve is closed and when the trap is cool the valve is open to the end that excessive discharges of water into the trap may find easy escape.

7. In a steam trap, the combination of the inclosing case having induction and eduction ports, a float actuated valve to control the escape of water from the trap, an auxiliary valve also controlling the discharge of the water from the trap, and actuating devices for said auxiliary valve controlled by the varying temperature within the trap, consisting of an arm connected with the auxiliary valve, means adapted under the application of a variable heat for operating upon the arm at different distances from the valve consisting of two transversely arranged oppositely curved plates supported at their ends by the casing, screws or adjustable devices extending through the said plates out of alignment, an arm supported between the said plates and screws or adjustable devices so as to have two points of support, one in advance of the other, and a connection between the free end of the arm and the valve.

8. In a steam trap, the combination of the inclosing case having induction and eduction ports, a float actuated valve to control the escape of water from the trap, an auxiliary valve also controlling the discharge of the water from the trap, and actuating devices for said auxiliary valve controlled by the varying temperature within the trap consisting of an arm connected with the auxiliary valve, two plates supported by the casing of the trap and adapted under the application of a variable heat to move to or from each other, projections carried by said plates operating upon the arm at different distances from the valve, and blocks receiving the ends of the expansion plates adapted to be driven into recesses in the sides of the trap.

In testimony of which invention I have hereunto set my hand.

JOSEPH POULSON.

Witnesses:
ERNEST HOWARD HUNTER,
C. H. NEWCOMB.